United States Patent
Wheeler

[15] 3,641,654
[45] Feb. 15, 1972

[54] SPLIT SHOT DEVICE

[72] Inventor: Raymond Ralph Wheeler, 514 Elk Drive, Riverton, Wyo. 82501

[22] Filed: June 9, 1969
[21] Appl. No.: 831,644

[52] U.S. Cl. ..................................29/212 D, 72/410
[51] Int. Cl. ..................................B23q 7/10
[58] Field of Search..................29/212 D, 212, 211; 72/410; 30/125

[56] References Cited

UNITED STATES PATENTS

| | | |
|---|---|---|
| 2,941,431 | 6/1960 | Christensen et al...................29/212 D |
| 3,003,376 | 10/1961 | Macy et al. ................................72/410 |
| 3,172,319 | 3/1965 | Stanfield..................................72/410 |
| 3,371,400 | 3/1968 | Edes .....................................29/212 D |

*Primary Examiner*—Gil Weidenfeld
*Attorney*—William Anthony Drucker

[57] ABSTRACT

A device for the storage and splitting of shot for fishing line has a body within which a plurality of shot are housed in one or more magazine recesses and can be positioned at an opening of the body for splitting by a cutter movably mounted on the body. A plurality of magazine recesses for different sized shot may be selectively presented at the opening, by rotation of a core adapted to be located in the selected position by locking means. A lever may be provided to act between the cutter and the body to permit increased force to be applied to split a shot. The cutter may carry a pusher member arranged to abut against and close to a split shot when the cutter is moved towards the body. The cutter may carry means serving as a guillotine for cutting fishing line.

11 Claims, 9 Drawing Figures

PATENTED FEB 15 1972

3,641,654

INVENTOR:
RAYMOND R. WHEELER

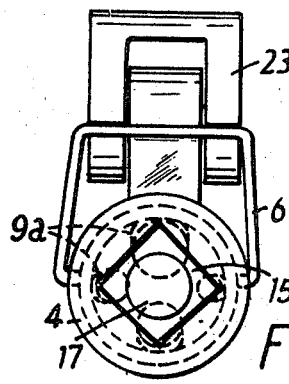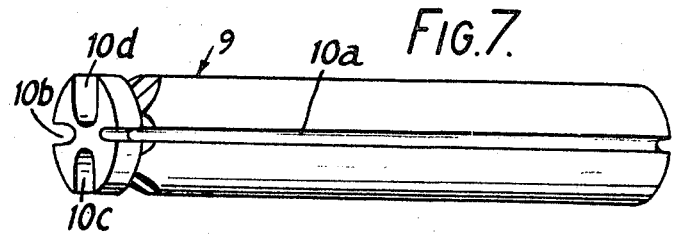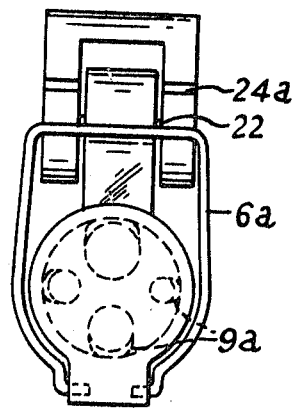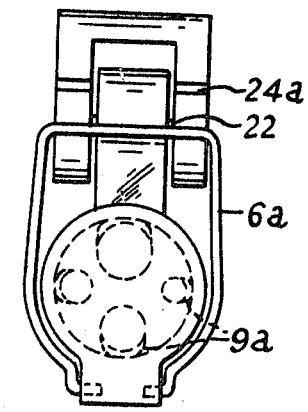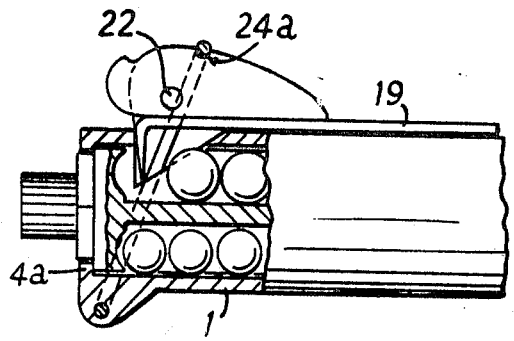

SPLIT SHOT DEVICE

SPECIFICATION

A well-known problem for fishermen is to get a split shot out of its container, position in on its leader or line, and then crimp it tightly in place. Difficulties are found because many commercially available split shot are poorly split in manufacture. Moreover, their small size makes the holding of them in the fingers very difficult, particularly when the hands are wet or cold. After a shot has been positioned around a line, it is usually crimped by the teeth of the fisherman.

Removing a split sinker shot is also laborious and time consuming. It is difficult to hold the small round shot whilst attempting to insert a blade into the original split, and then apply just the proper pressure to the blade without going too deep and cutting the line. A sudden inadvertent rolling movement of the round shot can result in a ruined line or a cut finger.

The main object of the present invention is accordingly to provide a device which permits the storage and splitting, or reopening, of shot for fishing line in a particularly simple and advantageous manner.

A second object is to provide such a device in which a plurality of shot of different grades may be accommodated in magazines, and in which any selected grade of shot can be presented for splitting by a simple movement of a lockable selector.

A third object is to provide such a device in which leverage is provided to facilitate cutting of shot, especially of larger diameters.

A fourth object is to provide such a device which permits simple mechanical reclosure of a split shot.

In order that the nature of the invention may be readily ascertained, an embodiment of device for the storage, delivery, splitting and closure of shot for fishing lines is hereinafter particularly described with reference to the figures of the accompanying drawing, wherein:

FIG. 5 is an end elevation viewed from the left-hand end of FIG. 2 in this drawing;

FIG. 7 is a perspective elevation of a rotatable core member;

FIG. 8 shows an end elevation of a modification, viewed from the left-hand end of FIG. 2 in this drawing;

FIG. 9 is a partial longitudinal axial section of the modification.

Figure 1:
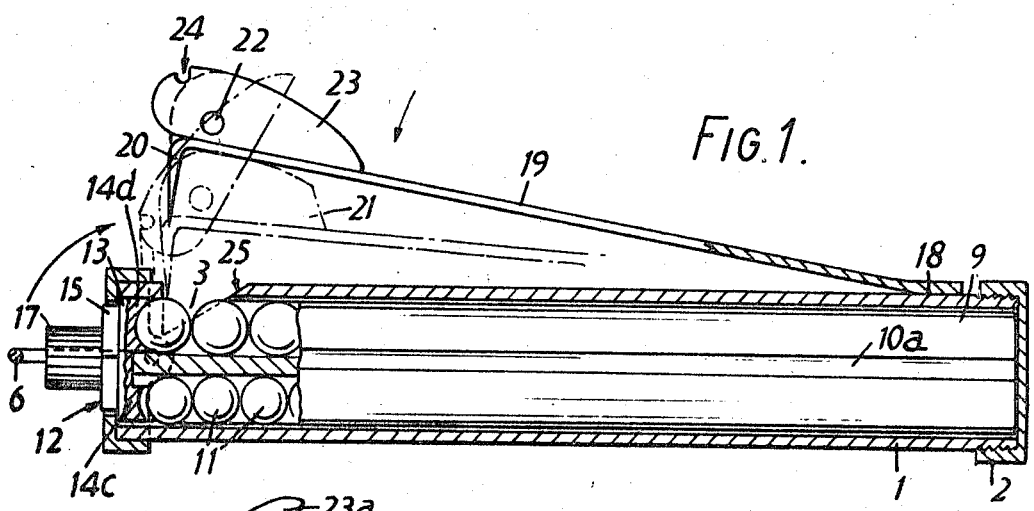
FIG. 1 is a longitudinal axial section of the entire device in which certain parts are shown in elevation.

The device comprises a hollow cylindrical tubular body 1 which is externally screw threaded at one end to receive an internally threaded thrust cap 2. Adjacent its other end, the body has an access opening 3. The other end of the body is not threaded, but receives over it an end cap 4 which is located and retained in position by in-turned ends 5 of a U-shaped wire link 6, said ends 5 passing through apertures 7 in lugs 8 on the cap 4, and engaging into corresponding apertures provided in the body 1.

Instead of being formed as a separate element which is secured in position by the ends of the wire link, the end cap 4 may be formed as an integrally moulded end portion of the body 1, see FIG. 9.

Within the body 1 there is disposed, with adequate clearance for free rotation, a core member 9 which is best seen in FIG. 7. The core member is a solid and generally cylindrical rod in which there are formed, at 90° positions spaced symmetrically about its axis, four magazine channels 10a, 10b, 10c and 10d which are all of respectively different depth and width, and each of which is of such depth and width as to receive with clearance a series of shot 11 of one of the conventional diameters.

Figure 6:
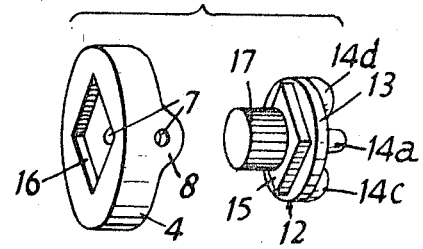
FIG. 6 is a perspective elevation of an end cap and of a selector knob, seen in axially separated position.

In order to prevent the shot in the channels from simply falling out when the core member is removed from the body 11 the outer edges of the core defining each channel are provided with an inwardly projecting lip 9a, so that the gap between the opposed lips is somewhat less than the diameter of the shot to be received in that channel. Such lips do not interfere with the free movement of the shot along the channel. Adjacent one end, the core member 9 is cut away similarly to the access opening 3 of the body member, so that when a selected magazine is presented in alignment with the access opening 3, the end shot of the series of shots in the magazine channel is presented at the access opening 3. To ensure positive location of the core member 9 in a desired position of rotation with respect to the body 1, there is provided a selector knob 12 seen best in FIG. 6. This knob comprises a disc portion 13 from which four cylindrical lugs 14a, 14b, 14c and 14d project parallel to its axis, said lugs being of such diameter as to fit within the ends of the channels 10a, 10b, 10c and 10d, thereby keying the selector knob to the core member for rotation. It will be appreciated that, instead of locating into the channels of the core member, the selector knob 12 could be formed as an integrally moulded end portion of the core member, see FIG. 9. The selector knob 12 also has a squared portion 15 which is a clearance fit into a squared opening 16 provided in the end cap 4. The axial length of each of the lugs is such that it acts as a stop to cause the selected shot to be accurately positioned in the access opening 3.

When the thrust cap 2 is tightened fully onto the body 1, it abuts against one end of the core member 9 and presses the core member 9 and the selector knob 12 towards the other end of the body, thereby ensuring that the squared portion 15 of the selector knob remains firmly engaged into the squared opening 16 at the end cap 4, the latter being located with respect to the body 1 by the wire lugs 5. To permit rotation of the core member 9, with respect to the body 1, for the repositioning of the core member with another selected magazine channel aligned with the access opening 3, the thrust cap 2 is slackened off sufficiently to permit the core member 9 and the selector knob 12 to be pushed manually along the body member until the square portion 15 of the selector knob is moved clear of the squared opening 16 of the end cap 4, and the selector knob can then be rotated manually by grasping its knurled portion 17 between the finger and thumb. When the desired position of alignment has been obtained, the thrust cap 2 is tightened again to cause the selector knob 12 to become locked again to the end cap 4.

Thus, as so far described, the device permits the presentation, at the access opening 3, of the magazine of shot 11 of any selected one of four different diameters.

On the body 1 there is secured at 18 a resilient cutting member 19 having a sharpened cutting blade 20 at its free end. The rest position of the cutting member is as shown in full lines in FIG. 1. The cutting member can be pressed inwardly by hand to cause the cutting blade 20 to engage into and partially split a shot 11, or to reopen a closed shot.

On the cutting member 19 there is secured a thumb rest consisting of a block 21 carrying a pivot 22 for a thumb lever 23 of U shape. The thumb lever 23 has a rest position, seated against the upper surface of the cutter member 19, as shown in full line in FIG. 1. If the shot to be split is of a comparatively small diameter, the force required to drive the cutting blade 20 into it can readily be exerted by simple manual pressure on the cutter member 19, i.e., by pressure of the thumb on the thumb rest as a whole.

Figure 2:
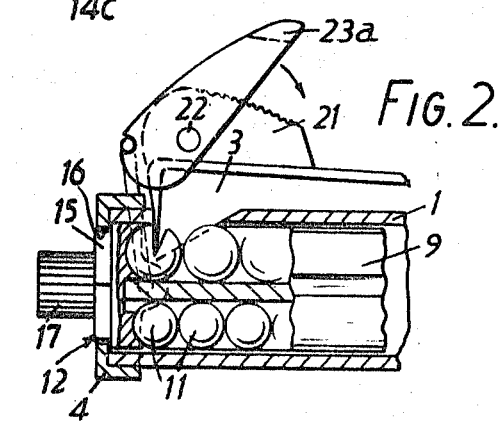
FIG. 2 is a partial longitudinal axial section of the device, to show the use of a thumb lever for the easier splitting or reopening of heavier gauges of shot.

If the shot to be split is of somewhat larger diameter, it will be necessary to apply greater force to the cutter member 19, and this is obtained by use of the thumb lever, as follows. The wire link 6 is pivoted about its lugs 5 until its cross member rests in a recess 24 of the shorter arm of the thumb lever, as best seen in FIG. 2. Thereafter a pressure with the thumb against the remote end of the longer arm of the thumb lever will give a multiplication of force of, say, three times, to drive the cutter blade 20 into the shot. The thumb lever 23 is then rotated in anticlockwise direction, and the wire link again disengaged from the recess 24.

Figure 3:
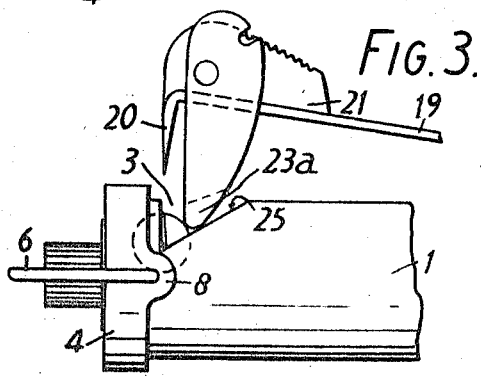
FIG. 3 is a partial side elevation to show the use of the thumb lever for closing of a split shot.
Figure 4:
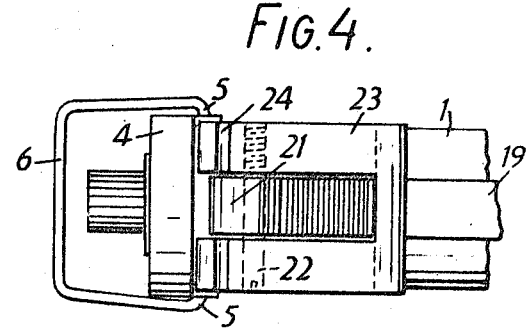
FIG. 4 is a partial plan view of the device in its position of FIG. 1.

FIGS. 8 and 9 show a modification in which the wire link 6a is hinged from the bottom of the body 1 instead of at the approximately diametral position shown in FIGS. 1, 3 and 5, the end cap 4a then being moulded integrally onto the end of the body 1. The hinging of the wire link 6a at the bottom of the end cap provides a longer radius for facilitating movement of the link from the recess 24 to a second recess 24a which is positioned between the pivot 22 and the tail end of the thumb lever. Accordingly, if the wire link 6 is engaged into the second recess 24a, and assuming that the resilient cutter member 19 is pressing outwardly, the wire link will lock the thumb lever and cutter member in the nonuse or storage position shown.

When the fishing line has been inserted into the cut made in the shot 11, it is then necessary to close the lips of the cut together again. This is performed by rotating the thumb lever 23 still further in anticlockwise direction until it comes into the position shown in FIG. 3. In this position, and assuming that the largest of the shot chambers is presented at the access opening 3, the tail end portion 23a of each leg of the thumb lever rides down the inclined guide surfaces 25 of the access opening 3 of the body, and the shot 11 is gripped between the thumb lever and the end of the respective lug 14 of the selector knob, and can thus be forced closed by sufficient pressure applied to the cutter member 19.

When any of the smaller channels are presented at the access opening 3, they protrude slightly above the guide surfaces 25 and the tail end portion 23a of the thumb lever then rides down the correspondingly inclined guide surfaces of the core member itself.

One further function which commonly has to be carried out in relation to fishing line and split shot is the cutting of line before or after the fitting of the shot. For this purpose, the upper surface portion 26 of the block 21 is made serrated so that when the line is placed across that portion, and the thumb lever 23 is pressed downwardly, the thumb lever passes about each side of the portion 26 and acts as a guillotine to cut the line. The device thus serves for the following functions:

i. safe storage, in their respective grades of diameter, of a plurality of sizes of shot;
ii. presentation of a selected grade of shot at the window;
iii. splitting and reopening of both light and heavy shot without difficulty;
iv. reclosing of both light and heavy shot about a line;
v. cutting of a line.

I claim:

1. A device, for the storage of series of unsplit shot and for the successive splitting of individual said shot suitably for engagement on a fishing line, which comprises a hollow body having an opening, a core rotatable in said body and having a plurality of longitudinal magazine channels spaced about its axis of rotation to receive respective series of discrete unsplit shot of different sizes such that a leading shot of each series may be presented opposite said opening, means included in said body for holding said core releasably against rotation, and a cutter mounted on the body and movable through said opening, said cutter being positioned in relation to said opening such that said cutter engages into said leading shot at said opening to split said shot.

2. A device, as claimed in claim 1, wherein said holding means comprise a selector member integral with or coupled for rotation with the core, means for keying said selector member in any selected one of a plurality of positions of rotation, with respect to the body, in which a channel of the core is aligned with said opening.

3. A device, as claimed in claim 2, wherein said selector member has a noncircular portion adapted to engage in keying manner into a corresponding noncircular aperture of the body, said selector member and said core being movable axially within the body to permit disengagement of the noncircular portion of the selector member from the noncircular aperture of the body to permit rotation of the selector member and the core to a selected position of relative rotation.

4. A device, as claimed in claim 3, wherein the body is a cylindrical tube and has an end cap which is axially adjustable on the body and which abuts against the core to retain the core and the selector member releasably in the locked position.

5. A device, as claimed in claim 1, comprising a lever acting between the cutter and the body to apply increased force on the cutter for engaging into a shot.

6. A device, as claimed in claim 5, wherein said lever is a two-arm lever pivotably mounted on the cutter member and having its shorter arm coupled to the body.

7. A device, as claimed in claim 6, wherein the shorter arm of the lever is coupled to the body by a link movably carried on the body and releasably engageable with said shorter arm.

8. A device, as claimed in claim 6, wherein inclined guide surface means are formed on said body adjacent to said opening, and wherein an arm of said two-arm lever is positioned to slide along said guide surface means, as the cutter is moved towards said opening, to engage against a split leading shot of the series, thereby to force the shot closed.

9. A device, as claimed in claim 6, wherein a block is provided on said cutter, and wherein an arm of said two-arm lever is arranged to pass about said block such that the block and the arm act as a guillotine for cutting fishing line laid on the block.

10. A device, as claimed in claim 1, comprising a pusher member movably mounted on the cutter, and inclined guide surface means formed on the body adjacent to said opening, said pusher member being positioned to slide along said guide surface means as the cutter is moved towards said opening, and engage against a split leading shot of the series, thereby to force the shot closed.

11. A device, as claimed in claim 10, wherein said pusher member is arranged to move, in relation to the cutter member, so as to act as a guillotine for cutting fishing line.

* * * * *